United States Patent [19]

Yeow et al.

[11] Patent Number: 5,594,317
[45] Date of Patent: Jan. 14, 1997

[54] INDUCTIVE CHARGER FIELD SHAPING USING NONMAGNETIC METALLIC CONDUCTORS

[75] Inventors: Eddie Y. Yeow, San Gabriel; Ray G. Radys, Santa Monica; George R. Woody, Redondo Beach; Sergio Ramos, Wilmington, all of Calif.

[73] Assignee: Delco Electronics Corp., Kokomo, Ind.

[21] Appl. No.: 348,667

[22] Filed: Dec. 2, 1994

[51] Int. Cl.⁶ ........................................ H01M 10/46
[52] U.S. Cl. ........................................ 320/2; 336/DIG. 2
[58] Field of Search .................... 320/2, 5; 336/DIG. 2, 336/55, 60, 61

[56] References Cited

U.S. PATENT DOCUMENTS

| | | | |
|---|---|---|---|
| 5,341,083 | 8/1994 | Klontz et al. | 320/2 |
| 5,379,021 | 1/1995 | Ito et al. | 336/DIG. 2 |
| 5,408,209 | 4/1995 | Tanzer et al. | 320/2 X |
| 5,412,304 | 5/1995 | Abbott | 320/2 |
| 5,434,493 | 7/1995 | Woody et al. | 320/2 |
| 5,483,143 | 1/1996 | Hall et al. | 320/2 |

FOREIGN PATENT DOCUMENTS 58-108726  6/1993  Japan.

*Primary Examiner*—Edward H. Tso
*Attorney, Agent, or Firm*—Mark A. Navarre

[57] ABSTRACT

An inductive battery charging system that uses heat conducting heat exchangers that shape electromagnetic fields produced by the windings of the charging system. The field shaping provided by the heat exchangers of the present invention improves the power handling capacity of the system. The charging system includes a charge probe that includes a primary winding of a transformer and a charge port that includes secondary windings of the transformer. The heat exchangers are heat sinks that are inserted between or are disposed adjacent turns of the windings and are used to remove heat from windings. In the present invention, the heat exchangers are also used to shape the leakage flux near the edges of the windings in such a manner that AC losses in the windings are considerably reduced. The present invention may be used to increase the inductive charging capacity of an electric vehicle battery pack to on the order of 120 KW and beyond. The present invention eliminates overheating in the at the interface between the transformer windings at a 50 KW level or higher. The present invention may be used with almost any magnetic device, such as a transformer or inductor that uses foil windings or solid wire conductors.

5 Claims, 2 Drawing Sheets

INDUCTIVE CHARGER FIELD SHAPING USING NONMAGNETIC METALLIC CONDUCTORS

BACKGROUND

The present invention relates to inductive battery charging systems, and more particularly, to the use of metallic conductors, and in particular heat exchangers, to shape the electromagnetic fields produced by an inductive battery charging system that improves the power handling capacity of the system.

It is desirable to raise the power handling capacity of battery packs employed in electric vehicles to 120 KW and beyond. However, it has been found that, at 50 KW or higher, overheating at the interface between the inductive charger and electric vehicle becomes a major limiting factor.

Therefore, it is an objective of the present invention to provide for an inductive battery charging system that employs electrically conductive heat exchangers that shape electromagnetic fields produced by the system and improve the power handling capacity of the system.

SUMMARY OF THE INVENTION

In order to meet the above and other objectives, one particular embodiment of the present invention is an inductive battery charging system that uses electrically conductive heat exchangers comprising nonmagnetic metallic conductors, such as heat conducting bladders, that shape electromagnetic fields produced by the charging system. This field shaping technique improves the power handling capacity of the system. One such charging system includes a charge probe that includes a primary foil winding of a transformer and a charge port that includes a secondary foil winding of the transformer. The charge probe is inserted into an opening in the charge port and power is coupled from a power source connected to the charge probe to vehicle batteries that are coupled to the charge port.

The electrically conductive heat exchangers or bladders comprise heat sinks that are inserted between turns of the windings and are used to remove heat from windings of the transformer. In the present invention, the heat exchangers are also used to shape the leakage flux near the edges of foil windings of the transformer in such a manner that AC losses in the windings are considerably reduced.

More particularly, the present invention provides for one such inductive charging system is used in charging batteries of an electric vehicle. The inductive charging system comprises a power source, a charge station coupled to the power source, and a charge paddle that has a primary core (or core piece) and a primary winding coupled to the charge cable by means of an extendable charging cord. A charge port is disposed in the electric vehicle that has a secondary core and secondary windings, and a charge controller is coupled between the charge and the batteries of the electric vehicle.

The improvement provided by the present invention includes a charge paddle that comprises a primary heat exchanger having a length that extends from one inner edge of the secondary core to the other inner edge of the secondary core, and a charge port that comprises secondary heat exchangers each having a width that extends from one inner edge of the secondary core to the other edge of the secondary core. The primary and secondary heat exchangers shape leakage flux at the edges of the windings to reduce AC losses.

The present invention addresses the need to raise inductive charging capacity of electric vehicle battery packs up to 120 KW and beyond. The present invention eliminates overheating at the interface between the inductive charger (probe) and electric vehicle (port) at a 50 KW level or higher.

Although the present invention was designed for use in electric vehicle charger systems, it is a generic discovery that may be used with other magnetic devices including transformers or inductors that use foil windings or solid wire conductors.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1b illustrates the primary components of the inductive charging system of FIG. 1a;

DETAILED DESCRIPTION

Figure 1A:
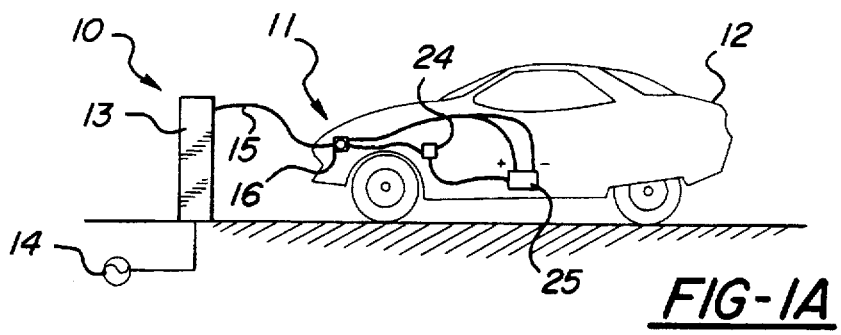
FIG. 1a illustrates an electric vehicle inductive charging system employing electrically conductive heat exchangers in accordance with the principles of the present invention.

Referring to the drawing figure, FIG. 1a illustrates an electric vehicle inductive charging system 10 employing an inductive charger 11 comprising nonmagnetic metallic electrically conductive heat exchangers 32, 35, 36 (FIG. 2) in accordance with the principles of the present invention. FIG. 1a shows the interconnection of the inductive charger 11 to an electric vehicle 12. A charge station 13 is coupled to a power source 14 and has an extendable charging cord 15 that is coupled to a charge paddle 16 (or charge probe 16). The charge probe 16 or paddle 16 comprises a primary core 29 or core piece 29 (FIG. 2) and a primary winding 21 (FIG. 2) of a transformer 20 and is inserted into a charge port 22 disposed at the front end of an electric vehicle 12 that comprises secondary core 33 (FIG. 2) and secondary windings 23 (FIG. 2) of the transformer 20. The charge port 22 and the charge probe 16 form an inductive coupler. The charge port 22 is coupled to a charge controller 24 that interfaces to a propulsion battery pack 25 or batteries 25 of the electric vehicle 12.

Figure 1B:
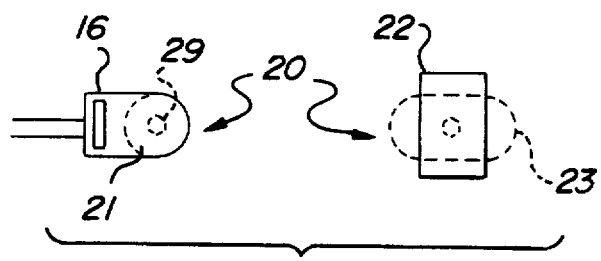

Low frequency AC provided by the power source 14 is converted to high frequency AC (75 KHZ) and then passed through the inductive coupler. The output of the secondary windings 23 of the inductive coupler is rectified and filtered in the charge controller 24 and is used to recharge the battery pack 25 of the electric vehicle 12. FIG. 1b shows the two portions of the inductive coupler, namely the charge paddle 16 (probe 16) and the charge port 22. The charge paddle 16 contains the core piece 29 and primary winding 21 of the transformer 20 while the charge port 22 contains the secondary transformer cores 33, typically E-shaped cores, and the secondary windings 23.

Figure 1C:
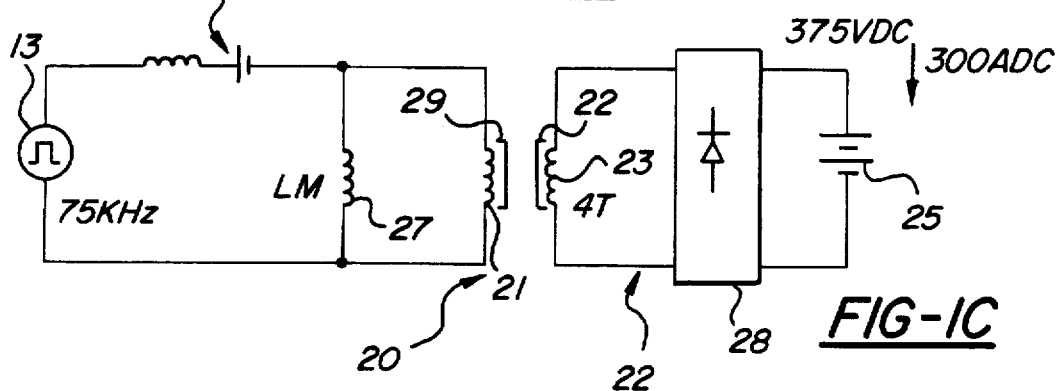
FIG. 1c illustrates an electrical diagrams corresponding to the components shown in the inductive charging system of FIG. 1b.

FIG. 1c shows a simplified electrical schematic of the interface between the charger 11 and the electric vehicle 12. FIG. 1c shows that the charge station 13 produces a 75 KHz output that is passed through a resonant tank circuit 26 connected to the charge paddle 16 that comprises the primary winding 21 of the transformer 20. The charge port 22 comprises the secondary windings 23 of the transformer 20 and AC flows through a rectifier 28 which produces a 375 volt DC signal at 300 amps that is transferred to the battery pack 25 of the electric vehicle 12.

Figure 2:
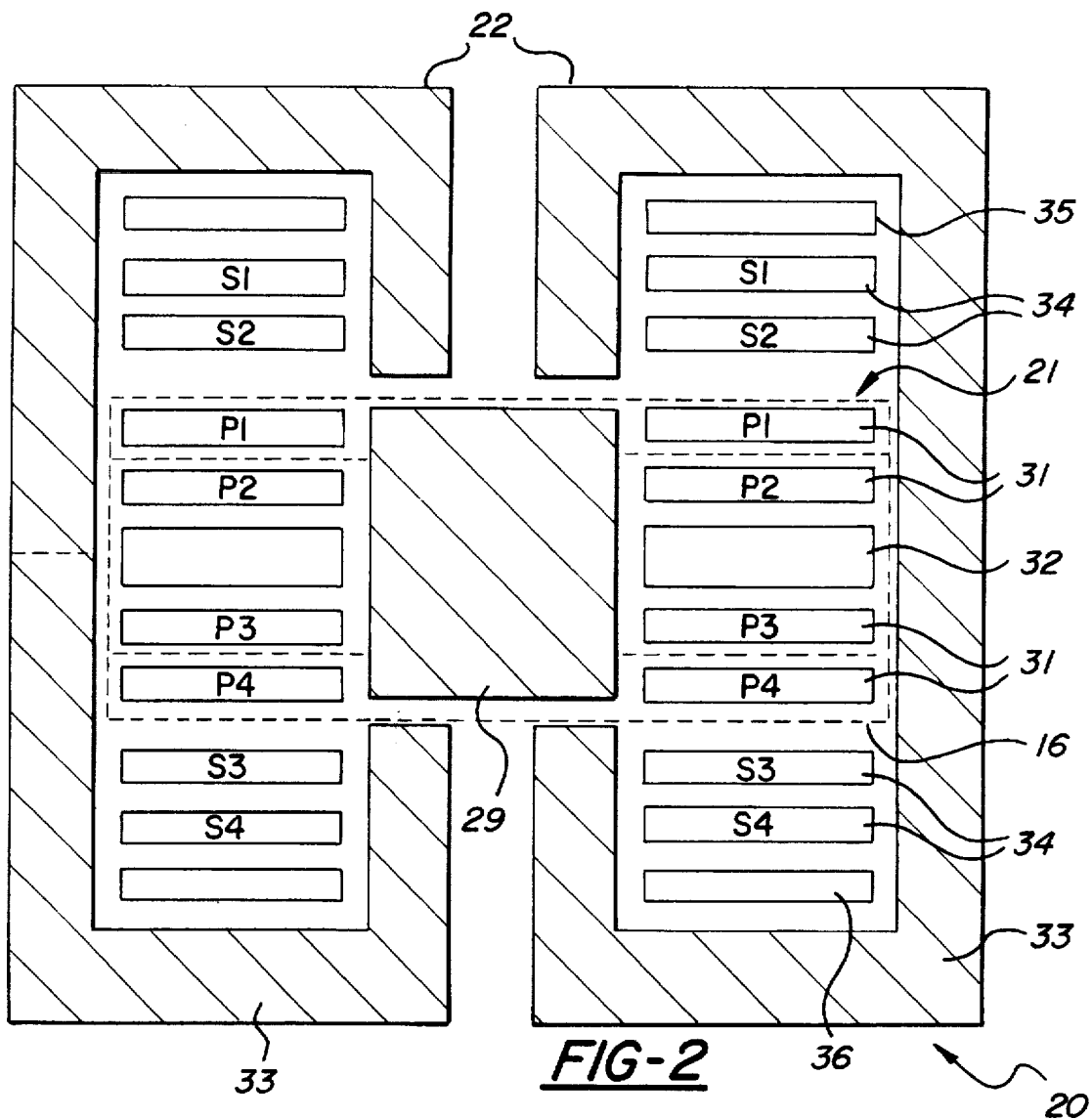
FIG. 2 illustrates a enlarged cross sectional view of the components of the inductive charging system of FIGS. 1b and 1c in a mated condition, detailing the heat exchangers in accordance with the principles of the present invention.

FIG. 2 shows an enlarged cross sectional view of the transformer 20 formed by the charge probe 16 and charge port 22. The paddle 16 is comprised of a core piece 29, the primary winding 21 which includes four turns 31 (P1 to P4), and a primary heat exchanger 32. The charge port 22 is comprised of two E-cores 33, the secondary winding 23 comprising four turns 34 (S1 to S4), and upper and lower secondary heat exchangers 35, 36. All of the turns 31, 34 of the windings 21, 23 of the transformer 20 are made from flat spiral copper foils. Alternatively, the turns 31, 34 of the windings 21, 23 may be comprised of solid wire conductors. The heat exchangers 32, 35, 36 comprise heat sinks that are heat conducting and that are typically made of copper or aluminum, for example, that are inserted between or adjacent turns 31, 34 of the windings 21, 23 and that remove heat from windings 21, 23 of the transformer 20.

Figure 3:
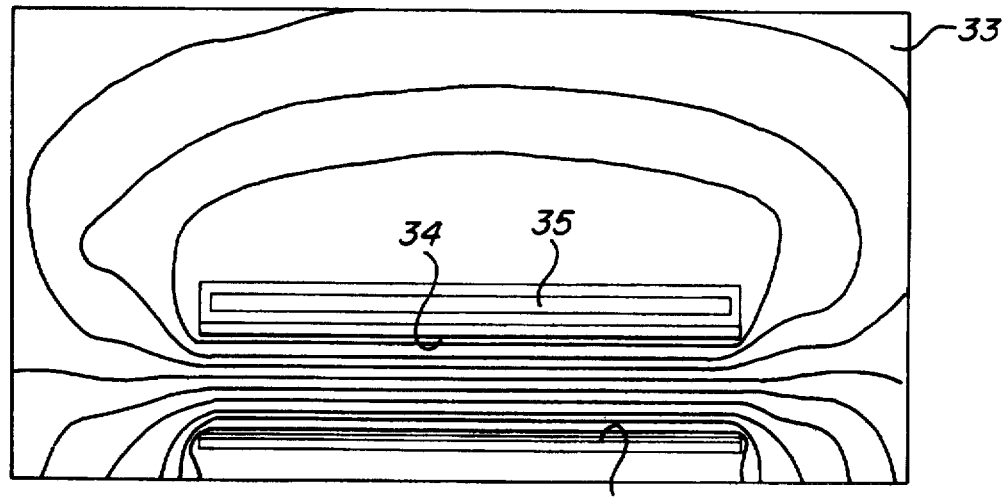
FIG. 3 is a diagram showing the electromagnetic fields produces by the charging system of FIGS. 1a–1c with a narrow secondary heat exchangers and no primary heat exchanger.
Figure 4:
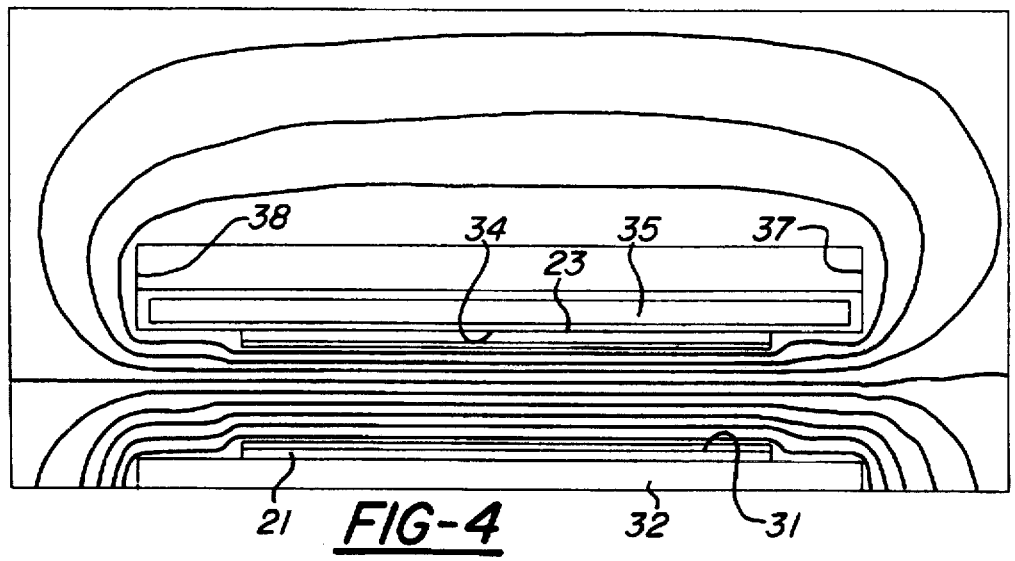
FIG. 4 is a diagram showing the electromagnetic fields produces by the charging system of FIGS. 1a–1c with a wide secondary and primary heat exchangers.

FIG. 3 is a diagram showing the electromagnetic fields produced by the charging system 10 of FIGS. 1a–1c with no primary heat exchanger 32 and a narrow secondary heat exchanger 35. FIG. 3 shows the case where one less wide (relatively narrow) heat exchanger 35 is employed adjacent the secondary winding 23 of the charge port 22. FIG. 4 is a diagram showing the electromagnetic fields produces by the charging system of FIGS. 1a–1c with wide secondary heat exchangers 35, 36 (heat exchanger 36 is not shown). FIG. 4 shows the case where two wide secondary heat exchangers 35, 36 are employed adjacent the secondary winding 23 of the charge port 22.

Table 1 shows the effects that the heat exchangers 35, 36 have on AC winding losses in the charge port 22. The first column (1) identifies the location of the turn 31, or heat exchanger 32, 34, 35. The second column (2) shows the DC losses. The third column (3) shows AC+DC losses for a narrow secondary heat exchanger 35 and no primary heat exchanger 32. The fourth column (4) shows AC+DC losses for narrow heat exchangers 32, 35, 36. The fifth column (5) shows AC+DC losses for wide heat exchangers 32, 35, 36 overlapping the windings 21, 23.

TABLE I

| LOSS SUMMARY IN WATTS AT 75 KHZ | | | | |
|---|---|---|---|---|
| (1) | (2) | (3) | (4) | (5) |
| P1 | 85.6 | 126.5 | 122.3 | 104.8 |
| P2 | 34.2 | 90.4 | 66.1 | 41.7 |
| Primary heat exchanger | 0 | 0 | 15.2 | 45.7 |
| P3 | 34.2 | 90.4 | 66.1 | 41.7 |
| P4 | 85.6 | 126.5 | 122.3 | 104.8 |
| S1 | 34.1 | 58.1 | 57.8 | 41.5 |

TABLE I-continued

| LOSS SUMMARY IN WATTS AT 75 KHZ | | | | |
|---|---|---|---|---|
| (1) | (2) | (3) | (4) | (5) |
| S2 | 85.3 | 115.8 | 115.8 | 104.4 |
| Upper secondary heat exchanger | 0 | 13.8 | 13.6 | 43.5 |
| S3 | 85.3 | 115.8 | 115.8 | 104.4 |
| S4 | 34.1 | 58.1 | 57.8 | 41.5 |
| Lower secondary heat exchanger | 0 | 13.8 | 13.6 | 43.5 |
| TOTAL | 479 | 808 | 767 | 717 |
| No heat exchangers | 479 | 750 | 725 | 575 |

Measured data was obtained which verified the simulated results. Simulated DC losses are 479 watts. AC+DC losses increase to 825 watts. Using only one narrow heat exchanger 35 adjacent the secondary winding 23 in the charge port 22, total losses (without the second heat exchanger 36) drops to 780 watts. Using two narrow heat exchangers 35, 36 in the charge port 22, losses are reduced to 725 watts. Using two wide heat exchangers 35, 36 in the charge port 22, losses drop to 575 watts, thus providing for a 250 watts improvement over a transformer having no heat exchangers 35, 36. The narrow heat exchangers 35, 36 have lengths that are as long as the windings 23. The wide heat exchangers 35, 36 have a length that extends from one inner edge 37 of the core 33 to the other inner edge 38 of the core 33.

The reason for this large improvement is more clearly shown in FIGS. 3 and 4. The transformer 20 used to produce the graph of FIG. 3 does not contain a primary heat exchanger 32. As a result, the leakage flux curves around the edges of the primary winding 21. This induces large eddy current losses in the edges of the primary winding 2. The leakage flux lines also curl around the secondary windings 23, but not as sharply, because eddy currents in the heat exchanger 35 regenerate an opposing field.

The transformer 20 used to produce the graph of FIG. 4 employs two wide heat exchangers 32, 35. Eddy currents are induced in the wide heat exchangers 32, 35, and regenerate an opposing field, which reduces the resultant flux lines. This keeps the flux away from the edges of the windings 21, 23. Without such edge effects, AC losses can be reduced from two-dimensional to one-dimensional, where simple one-dimensional equations (respect to skin depth only) can be very adequately used for design and optimization. The increase in heat exchanger losses is small compared to the savings in the windings 21, 23. The wide heat exchangers 32, 35, 36 perform triple duty. They act as heat sinks for the windings 21, 23, they cause the total amount of power lost in the windings 21, 23 to reduce by 108 watts for the embodiment shown, and they transfer 142 watts from the windings 21, 23 to the heat exchangers 32, 25, 36, for an overall improvement of 250 watts for the embodiment shown.

Thus, there has been disclosed a new and improved inductive battery charging system that employs heat exchangers that shape electromagnetic fields produced by the charging system to improve the power handling capacity of the system. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. An inductive charging system for use in charging batteries of an electric vehicle, wherein said inductive charging system comprises a power source, a charge station coupled to the power source, a charge paddle that comprises a primary core and a primary winding of a transformer coupled to the charge cable by means of an extendable charging cord, a charge port disposed in the electric vehicle that comprises a secondary core and secondary windings of the transformer, and a charge controller coupled between the charge port and the batteries of the electric vehicle, wherein the improvement comprises:

a charge paddle that comprises a primary heat exchanger having a width that overlaps the primary winding, and wherein the primary heat exchanger shapes leakage flux at edges of the primary winding to reduce AC losses therein by reducing two-dimensional losses; and a charge port that comprises secondary heat exchangers each having a width that overlaps the secondary windings, and wherein the secondary heat exchangers shape leakage flux at edges of the secondary windings to reduce AC losses therein by reducing two-dimensional losses.

2. The system of claim 1 wherein the primary heat exchanger is disposed between predetermined ones of the turns of primary winding, and wherein the secondary heat exchangers are disposed adjacent predetermined ones of the secondary winding.

3. The system of claim 1 wherein the primary winding is comprised of an even number of turns and is disposed around the primary core, and wherein the primary heat exchanger is disposed between the even number of turns, and wherein the secondary core comprises an E-core having a plurality of windings disposed between inner edges thereof, and wherein the secondary heat exchangers are disposed between respective the secondary winding and inner surfaces of the E-core.

4. The system of claim 1 wherein the transformer comprises a primary winding having an even number of turns wherein the heat exchanger is centrally disposed between the even number of turns, and a plurality of secondary windings that have heat exchangers disposed at distal surfaces of the secondary windings.

5. The system of claim 1 wherein the heat exchangers comprise nonmagnetic metallic electrically conductive heat exchangers.

* * * * *